3,277,029
FOAMED COMPOSITIONS
David H. Chadwick, New Martinsville, W. Va., and Robert K. Kirkendall, Wheeling, Ill., assignors to Mobay Chemical Company, Pittsburgh, Pa., a corporation of Delaware
No Drawing. Filed Oct. 21, 1965, Ser. No. 500,247
11 Claims. (Cl. 260—2.5)

This invention relates to a desirable foamed composition. More specifically, this invention relates to novel foamed high molecular weight polycarbonate compositions and their method of manufacture, and this application is a continuation-in-part of application Serial No. 220,049, filed August 28, 1962, now abandoned.

It has been known to foam thermoplastic materials by forcing inert gas into the materials while in a molten form to produce the desired foam. While many of these foamed articles have been found to be very useful, a great many of these foamed materials leave much to be desired. It has been known, for example, to produce foamed articles from polystyrene, polyvinylchloride and methyl esters of polymethacrylic acid. In making a hard foam of many thermoplastic materials, and specifically those to be used in electrical insulation, these materials should possess a high resistance to permanent heat while having a low heat conductivity. It is also desirable that the material have a low water absorption, good mechanical properties and, of course, be substantially water resistant. Many of the prior art foam materials used in electrical insulation, while finding some commercial success, do not possess all of the above noted properties. For example, foamed polystyrene articles possess good electrical insulation properties, but exhibit a resistance to permanent heat only up to 60° C. and have poor breaking strength. This poor breaking strength is due to a great extent to the brittleness of the polystyrene. Foamed materials made from polyvinylchloride possess a poor resistance to heat and are slightly elastic. These above noted disadvantages not only apply to the noted polystyrene materials and the polyvinylchloride materials, but also to the polymethacrylic acid esters.

It is, therefore, an object of this invention to provide a method for the production of novel foam compositions. Another object of this invention is to provide novel foamed polycarbonate compositions. A still further object of this invention is to provide a novel method for producing foamed polycarbonate compositions utilizing heretofore unknown polycarbonate foaming agents. Still another object of this invention is to provide compositions capable of producing foamed polycarbonates when contacted with the desired polycarbonate compounds.

The foregoing objects and others which will become apparent from the following description are accomplished in accordance with this invention, generally speaking, by providing a method for foaming polycarbonate plastics by mixing a polycarbonate composition with a composition containing oxalic acid and heating the resulting mix until at least about the decomposition temperature of the oxalic acid is reached.

It has been found that the foamed polycarbonate having a molecular weight greater than 10,000 possess properties superior to the heretofore produced foamed materials. It is preferred for best results that the polycarbonate used have a molecular weight of from about 25,000 to 150,000. The polycarbonate foamed materials of this invention exhibit good electrical insulation properties while also having a higher resistance to permanent heat. It has also been found that the foamed polycarbonate compositions of this invention have good mechanical properties, are highly resistant to aging, good resistance to water, and are poor heat conductivity materials. The foamed polycarbonates disclosed herein are ideally used for electrical insulation especially in co-axial cable insulation. Not only do these compositions possess good electrical insulating properties, but they also add relatively little weight to the means being insulated. The use of the same thickness of solid polycarbonate would add more than twice the weight and also better than twice the cost for about equivalent insulating properties as provided by the foamed polycarbonate of this invention. Polycarbonate materials and their preparation have been well known in the prior art. It has been proposed heretofore to prepare high molecular weight linear polycarbonates by reacting di-(hydroxy aryl)-alkanes, di-(hydroxy aryl)-sulfones, di-(hydroxy aryl)-sulfoxides, di-(hydroxy aryl)-sulphites, di-(hydroxy aryl)-ethers or other aromatic dihydroxy compounds or mixtures of such compounds with carbonyl chlorides such as phosgene, diesters of carbonic acid or diphenyl carbonate. Polycarbonates, for example, have been manufactured by reacting Bisphenol A, 2,2-(4,4'-dihydroxy diphenyl propane) with phosgene or other carbonyl chlorides. A second known method for preparing polycarbonates is the ester interchange method whereby Bisphenol A is reacted with diphenyl carbonate to produce the desired polycarbonate. A number of methods for preparing aromatic polycarbonate are also given in detail in U.S. Patent 3,028,365.

It has been surprisingly found that desirable polycarbonate foams may be produced when the polycarbonate material is contacted with a compositon containing oxalic acid. This is in direct contrast to the results obtained when other carboxylic acid compounds were used or attempted to be used as foaming agents. Of the large number of carboxylic acid compounds tested only oxalic acid proved to be effective as a desirable commercial foaming agent for polycarbonates. Some of those carboxylic acid compounds which gave poor results (as compared to oxalic acid) have the general formulas $(COOH)_n (R)_n$ $(COOH)_n$ and $(R)_n$ $(COOH)_n$ wherein R is a substituted or unsubstituted organic radical and $n$ is equal to at least 1. It was totally unexpected from the results obtained when using these above noted compounds as foaming agents, that oxalic acid would exhibit the desirable foaming properties found in this invention.

In addition, auxiliary blowing agents may be combined with oxalic acid to form foamed polycarbonates. Blowing agents which either decompose or vaporize at the decomposition temperature of oxalic acid may be employed. Organic blowing agents yielding nitrogen-containing groups such as those containing an N-nitroso group, an azo group, a diazo group or a hydrazo group may be combined with the oxalic acid as a foaming agent. Examples of suitable blowing agents falling within the latter class are azodicarbonamide, dinitrosopentamethylene tetramine, p,p'-oxy-bis-(benzensulfonyl)-hydrazide, benzene-1,3-disulfonyl hydrazide, azo-bis-(isobutyronitrile) and the like. Other organic compounds which may be employed as blowing agents are biuret, urea, N,N'-dimethyl-N,N'-dinitrosoterephthalamide, pentane, cyclohexane, ligroin, petroleum ether, methylene chloride and other halogenated hydrocarbons. Where the organic compounds are likely to cause decomposition of the polycarbonates, it is preferred that specially stabilized polycarbonates be used. Also, inert gases such as nitrogen, argon, kyrpton, carbon dioxide, and the like, which may be introduced under pressure into the plastic melt may be used with oxalic acid as supplemental blowing agents.

All polycarbonate plastics irrespective of their method of manufacture are included within the scope of this invention. As indicated above, the polycarbonate plastic may be produced from a dihydroxy diaryl alkane with phosgene or a diester of a carbonic acid. It might be desirable in certain situations to use a derivative of oxalic acid rather than the acid per se.

The invention will be more specifically defined by the following examples. It should be noted, however, that these examples and the particulars disclosed therein will be given for the purpose of illustration only and are not to be taken as limiting.

Example 1

About 685 parts of Bisphenol A (3 mols) and about 6.5 parts of p-tertiary butyl phenol are suspended in about 2640 parts of water, in a well-agitated three-neck flask. The three-neck flask is equipped with a gas addition tube and drip tube for the addition of liquid. The oxygen is removed from the suspended Bisphenol A slurry by blowing nitrogen through it for a 15 minute period. After the removal of oxygen, about 480 parts of a 50 percent solution of sodium hydroxide is added. The reaction flask is then cooled to 25° C. by the application of external cooling. After the 25° C. temperature has been reached, about 1500 parts of methylene chloride is added to the reactor while agitating. After the methylene chloride addition is completed, the addition of phosgene is started at such a rate that over a 100 minute period about 356 parts (3.6 mols) phosgene is added while agitation is maintained. Simultaneously with the start of phosgenation, the addition of 50 percent sodium hydroxide is also commenced so that in an 80 minute period, about 192 parts of sodium hydroxide solution is added to the mixture. The temperature during the phosgenation reaction is maintained at 25° C. by the application of external cooling. At the end of the phosgenation, 2 parts of triethylamine is added to the reaction mixture and the mixture is agitated for a period of 20 minutes. The agitation is now stopped and the mixture is allowed to separate into two phases. The lower, heavy phase will contain the polycarbonate in the form of a solution and the top phase will contain water, unreacted sodium hydroxide and sodium chloride. The top phase is decanted and disposed of. The polymer solution is successively washed with 1 percent sodium hydroxide, then with 1 percent phosphoric acid which is followed with water washes until the overflow water is essentially free of electrolytes.

In this process, after the end of the phosgenation, the reaction mixture is discharged to a heavy-duty mixer such as a Baker-Perkins sigma mixer and the 2 parts of triethylamine is added to the reaction mixture in the sigma mixer. After about 30 minutes of agitation, in the sigma mixer, the mixture becomes extremely viscous and forms a dough and an aqueous alkaline layer. The aqueous alkaline layer is discharged to the sewer, the dough is repeatedly washed with dilute caustic and dilute phosphoric acid and finally with several changes of distilled water until the overflowed water shows essentially no electrolyte as determined by conductivity measurements At the end of washing, this dough will break up into small particles which can be dried in a vacuum oven or in a double-cone tumble dryer to remove solvent and water. The powder obtained is then extruded on a conventional 1½″ extruder at about 550° F. and the strands cooled and chopped to obtain pellets. The resin pellets will have a relative viscosity of about 1.33–1.37 determined as 0.5 weight percent in $CH_2Cl_2$ at 25° C. This product is then divided into a plurality of equal portions.

Example 2

The polycarbonate composition prepared by the method disclosed in Example 1 is extruded on a conventional 1½″ extruder using a strip die. The extruder is maintained at a temperature of about 550° F. along its barrel. The extruded strip herein produced is a solid polycarbonate resin with no bubbles or foam present therein and has a density of 75 lbs./ft.$^3$.

Example 3

The polycarbonate prepared as described in Example 1 is dry blended with 0.454 gram/lb. of oxalic acid. This amount of oxalic acid would be equal to $5.1 \times 10^{-3}$ mols of acid per pound of polycarbonate. This mixture is extruded on a conventional 1½″ extruder using a strip die. The extruder is maintained at a temperature of about 500° F. along its barrel. The resulting composition is a desirable polycarbonate foam strip. The density of the foamed polycarbonate made by this example is measured to be 28 lbs./ft.$^3$. The density of unfoamed polycarbonate made by extrusion of the powder prepared by the method disclosed in Example 1 is 75 lbs./ft.$^3$ as indicated in Example 2.

Example 4

The polycarbonate prepared as described in Example 1 is dry blended with 0.454 gram per pound of malonic acid. This amount of malonic acid would be equal to $4.4 \times 10^{-3}$ mols of acid per pound of polycarbonate. This mixture was extruded on a conventional 1½″ extruder using a strip die. The extruder was maintained at a temperature of about 550° F. along its barrel. The resulting composition is a substantially solid polycarbonate strip having a density about equal to that of the unfoamed strip of Example 2.

Example 5

The polycarbonate prepared as described in Example 1 is dry blended with 0.454 gram per pound of tartaric acid. This amount of tartaric acid would be equal to $3.0 \times 10^{-3}$ mols of acid per pound of polycarbonate. This mixture was extruded on a conventional 1½″ extruder using a strip die. The extruder was maintained at a temperature of about 550° F. along its barrel. The resulting composition is a substantially solid polycarbonate strip having a density about equal to that of the unfoamed strip of Example 2.

Example 6

The polycarbonate prepared as described in Example 1 is dry blended with 0.454 gram per pound of citric acid. This amount of citric acid would be equal to $2.4 \times 10^{-3}$ mols of acid per pound of polycarbonate. This mixture was extruded on a conventional 1½″ extruder using a strip die. The extruder is maintained at a temperature of about 550° F. along its barrel. The resulting composition is a substantially solid polycarbonate strip having a density about equal to that of the unfoamed strip of Example 2.

Example 7

The polycarbonate prepared as described in Example 1 is dry blended with 0.454 gram per pound of lactic acid. This amount of lactic acid would be equal to $5.1 \times 10^{-3}$ mols of acid per pound of polycarbonate. This mixture is extruded on a conventional 1½″ extruder using a strip die. The extruder was maintained at a temperature of about 550° F. along its barrel. The resulting composition is a substantially solid polycarbonate strip having a density about equal to that of the unfoamed strip of Example 2.

Example 8

The polycarbonate prepared as described in Example 1 is dry blended with 0.454 gram per pound of propiolic acid. This amount of propiolic acid is equivalent to $6.5 \times 10^{-3}$ mols of propiolic acid per pound of polycarbonate. The resulting mixture is extruded on a conventional 1½″ extruder using a strip die. The extruder is maintained at a temperature of about 550° F. along its barrel. The resulting strip is substantially solid polycarbonate having a density very near that of the unfoamed strip of Example 2.

Example 9

An acetone dicarboxylic acid sample weighing about 0.454 gram is dry blended with one pound of the polycarbonate as prepared in Example 1. This amount of acetone dicarboxylic acid is equal to $3.1 \times 10^{-3}$ mols of the acid per pound of polycarbonate. The resulting mixture is extruded on a conventional 1½" extruder using a strip die. The extruder is maintained at a temperature of about 550° F. along its barrel. The resulting strip is substantially solid polycarbonate, having a density about equal to that of the unfoamed polycarbonate strip as prepared in Example 2.

Example 10

The polycarbonate prepared as described in Example 1 is dry blended with 2.45 grams/lb. of oxalic acid. This amount of oxalic acid would be equal to $2.7 \times 10^{-2}$ mols of acid per pound of polycarbonate. This mixture is extruded on a conventional 1½" extruder using a strand die. The extruder is maintained at a temperature of about 580° F. along its barrel. The resulting extrudate is a desirable polycarbonate foam strand whose density is measured to be 18.9 lbs./ft.$^3$.

Example 11

The polycarbonate prepared as described in Example 1 is dry blended with 2.45 grams/lb. of oxalic acid and 4.15 grams/lb. of azodicarbonamide. These amounts would be equal $2.7 \times 10^{-2}$ mols of oxalic acid and $3.58 \times 10^{-2}$ mols of azodicarbonamide per pound of polycarbonate. This mixture is extruded on a conventional 1½" extruder using a strand die. The extruder is maintained at a temperature of about 525° F. along its barrel. The resulting extrudate is a foamed polycarbonate strand in which the incidence of foaming is greater than the strand produced in Example 10 with oxalic acid alone.

Example 12

The polycarbonate prepared as described in Example 1 is dry blended with 2.45 grams/lb. of oxalic acid and 8.3 grams/lb. of p,p' - oxy - bis - (benzenesulfonylhydrazide). These amounts would be equal to $2.7 \times 10^{-2}$ mols of oxalic acid and $2.3 \times 10^{-2}$ mols of p,p'-oxy-bis-(benzenesulfonylhydrazide) per pound of polycarbonate. This mixture is extruded on a conventional 1½" extruder using a strand die. The extruder is maintained at a temperature of about 525 F. along its barrel. The resulting extrudate is a foamed polycarbonate strand in which the incidence of foaming is greater than the strand produced in Example 10 with oxalic acid alone.

Various degrees of foaming are obtained when oxalic acid is used in different amounts and/or different temperatures are used. Of course, the amount and type of polycarbonate to be used will dictate the amounts of oxalic acid required and the temperature at which the foaming operation will occur. The temperature of the extrusion must be at least above the melting point of the particular polycarbonate used and at least above the decomposition temperature of oxalic acid.

The above examples have specifically defined in detail the composition and methods of this invention. It is to be understood that these are given for the purpose of illustration, variations and ramifications may be made therein by those skilled in the art without departing from the spirit and scope of the invention except as set forth in the claims.

What is claimed is:

1. A foamable polycarbonate composition comprising a synthetic organic polycarbonate resin and oxalic acid as a foaming agent.

2. The composition of claim 1 wherein said polycarbonate is obtained by a process which comprises reacting 2,2-4,4'-dihydroxy-diphenyl)-propane and a substance selected from the group consisting of phosgene, diesters of carbonic acid and mixtures thereof.

3. A process for preparing a foamed synthetic organic polycarbonate resin which comprises heating a composition comprising an organic polycarbonate resin and oxalic acid to a temperature sufficient to cause foaming of the polycarbonate composition.

4. The process of claim 3 wherein the composition is heated to the decomposition temperature of the oxalic acid.

5. The process of claim 3 wherein the composition is heated to the melting point of the polycarbonate.

6. A process for producing a foamed synthetic organic polycarbonate resin which comprises mixing an organic polycarbonate resin with oxalic acid and subsequently extruding the resulting admixture at a temperature sufficient to cause foaming of the polycarbonate, said polycarbonate being obtained by a process which comprises contacting a dihydroxy diaryl alkane with a substance selected from the group consisting of phosgene, diesters of carbonic acid and mixtures thereof.

7. The process of claim 6 wherein the polycarbonate and oxalic acid admixture is extruded at the decomposition temperature of oxalic acid.

8. The process of claim 6 wherein the polycarbonate and oxalic acid admixture is extruded at a temperature of about the melting point of the polycarbonate.

9. A process for preparing a foamed synthetic organic polycarbonate resin which comprises mixing an organic polycarbonate resin with oxalic acid and subsequently extruding the resulting admixture at a temperature of about the melting point of the polycarbonate and at least above the decomposition temperature of the oxalic acid, said polycarbonate being obtained by a process which comprises contacting a dihydroxy diaryl alkane with a substance selected from the group consisting of phosgene, diesters of carbonic acid and mixtures thereof.

10. In the preparation of a foamed synthetic organic polycarbonate resin by a process which comprises mixing a foaming agent with the polycarbonate and subsequently heating said polycarbonate containing a foaming agent to a temperature above the melting point of the polycarbonate and sufficient to cause the foaming agent to expand the polycarbonate, the improvement which comprises mixing a solid organic polycarbonate resin with an oxalic acid foaming agent and heating the resulting mixture of polycarbonate and oxalic acid foaming agent to a temperature about the melting point of said polycarbonate and above the decomposition temperature of said oxalic acid to cause said polycarbonate to foam.

11. The process of claim 10 wherein said polycarbonate is based at least on 2,2(4,4'-dihydroxy-diphenyl)-propane.

References Cited by the Examiner

UNITED STATES PATENTS

| | | | |
|---|---|---|---|
| 2,628,945 | 2/1953 | Wayne | 260—2.5 |
| 2,941,964 | 6/1960 | Houston et al. | 260—2.5 |
| 2,966,471 | 12/1960 | Auspon | 260—2.5 |
| 3,044,970 | 7/1962 | Baumeister et al. | 260—2.5 |
| 3,075,929 | 1/1963 | Hebert et al. | 260—2.5 |
| 3,224,983 | 12/1965 | D'Alelio | 260—2.5 |

FOREIGN PATENTS 838,824    6/1960    Great Britain.

MURRAY TILLMAN, *Primary Examiner.*

M. FOELAK, *Assistant Examiner.*